US006725646B2

(12) United States Patent  
Callas et al.

(10) Patent No.: US 6,725,646 B2
(45) Date of Patent: Apr. 27, 2004

(54) ROTARY PULSE DETONATION ENGINE

(75) Inventors: James J. Callas, Peoria, IL (US); Scott B. Fiveland, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/119,987

(22) Filed: Apr. 10, 2002

(65) Prior Publication Data

US 2003/0192311 A1 Oct. 16, 2003

(51) Int. Cl.$^7$ ................................................ F02K 7/00
(52) U.S. Cl. ...................................................... 60/247
(58) Field of Search ............................... 60/39.44, 247, 60/249, 39.38, 39.39

(56) References Cited

U.S. PATENT DOCUMENTS

| | | |
|---|---|---|
| 4,741,154 A | 5/1988 | Eidelman |
| 5,345,758 A | 9/1994 | Bussing |
| 5,353,588 A | 10/1994 | Richard |
| 5,473,885 A | 12/1995 | Hunter, Jr. et al. |
| 5,513,489 A | 5/1996 | Bussing |
| 5,873,240 A | 2/1999 | Bussing et al. |
| 5,901,550 A * | 5/1999 | Bussing et al. ............ 60/39.38 |
| 5,937,635 A | 8/1999 | Winfree et al. |
| 6,062,018 A | 5/2000 | Bussing |

FOREIGN PATENT DOCUMENTS

| | | | | |
|---|---|---|---|---|
| EP | 1 138 922 A1 | | 10/2001 | |
| FR | 895703 | * | 5/1945 | ................ 60/39.44 |
| FR | 2278923 | * | 2/1976 | ................ 60/39.44 |
| GB | 922050 | * | 3/1963 | ................ 60/39.44 |
| IT | 304 590 | * | 1/1933 | ................ 60/39.44 |

* cited by examiner

Primary Examiner—Thomas Denion
Assistant Examiner—Thai-Ba Trieu
(74) Attorney, Agent, or Firm—Larry G Cain; Jason J Stanley

(57) ABSTRACT

A reciprocating internal combustion engine used a crankshaft to develop rotating motion. A rotary pulse detonation engine can be adapted to rotate a shaft. A combustor portion of the rotary pulse detonation engine is spaced from an axis of the shaft a preestablished distance therebetween in a mass member. An intake portion and an exhaust portion of the combustor portion is positioned in a parameter of the mass member. A combustion portion of the combustor portion is interposed the intake portion and the exhaust portion. The combustion portion has a frustoconical first position which converges to form a deflagration wave and progresses into a detonation. The deflagration to detonation transition occurs in the transition region. A combustible fuel and air mixture is combusted in the combustor portion creating a high speed jet exiting the exhaust portion and rotating the shaft.

17 Claims, 3 Drawing Sheets

ROTARY PULSE DETONATION ENGINE

TECHNICAL FIELD

This invention relates generally to an engines and more particularly to a pulse detonation engine having a high power density propulsion application.

BACKGROUND

A reciprocating internal combustion engine is widely used to transform chemical energy of a fuel into mechanical energy. Such engines have a complex mechanical combination of components used to transform the chemical energy into rotational motion. For example, a block has a cylinder formed therein and the cylinder is closed at an end by a head having a plurality of intake and exhaust valves therein. A piston having a connecting rod attached thereto is positioned in the cylinder and forms a combustion chamber. As combustion occurs within the combustion chamber, the piston is moved axially and the connecting rod which is attached to a crankshaft causes the crankshaft to rotate within the block to form the rotational motion. The complexity of mechanical components and the motion thereof results in a low efficiency of the reciprocating internal combustion engine. Additionally, the power-to-weight ratio is limited due to sliding friction, material temperature resistance and combustion pressure resistance.

Rotary engines reduce the mechanical complexity by eliminating the need to transform the reciprocating piston motion into the rotational motion of the crankshaft. However, the rotary engine does not substantially improve the efficiency or the power-to-weight ratio over the reciprocating internal combustion engine.

A rotary detonation engine has been suggested to overcome the power-to-weight ratio and to increase efficiency. One such rotary detonation engine is shown in U.S. Pat. No. 4,741,154 issued on May 3, 1988 to Shmuel Eidelman. It is speculated that the detonation engine of Eidelman has many shortcomings. A portion of such shortcomings being the introduction a continuous detonation mixture and the introduction of the detonation mixture within or near a shaft supporting a plurality of a rotor elements. Other shortcomings too numerous to define are contemplated such as distributing the detonation mixture to individual ones of the rotor elements.

The present invention is directed to overcoming one or more of the problems as set forth above.

SUMMARY OF THE INVENTION

In one aspect of the invention a pulse detonation engine has a shaft defining an axis; a mass member being positioned on the shaft, the mass member having a preestablished width and defining a parameter; a combustor portion being positioned in the mass member, the combustor portion being spaced from the axis a predetermined distance and defining an intake portion having a portion thereof positioned in the parameter and an exhaust portion having a portion thereof positioned in the parameter.

In another aspect of the invention a system for rotating a shaft, comprises: the shaft having an axis; a mass member being positioned on the shaft, the mass member having a preestablished width "W" and defining a parameter; a pulse detonation engine positioned in the mass member, the pulse detonation engine having a combustor portion being positioned in the mass member, the combustor portion being spaced from a predetermined distance and defining an intake portion having a portion thereof positioned in the parameter and an exhaust portion having a portion thereof positioned in the parameter; a compressor member being upstream of a flow of fuel and air entering the intake portion of the combustor portion; a mixer member being interposed the compressor member and the intake portion of the combustor portion; and an intake manifold being interposed the mixer member and the intake portion of the combustor portion.

In another aspect of the invention a method of rotating a shaft comprises: compressing an atmospheric air; mixing the compressed atmospheric air with a fuel forming a combustible fuel and air mixture; attaching a mass member to the shaft, the mass member defining a parameter and the shaft having an axis; positioning a pulse detonation engine in the mass member, the pulse detonation engine having a combustor portion being positioned in the mass member, the combustor portion being spaced from the axis a predetermined distance and defining an intake portion having a portion thereof positioned in the parameter and an exhaust portion having a portion thereof positioned in the parameter; supplying the combustible fuel and air mixture to the intake portion of the combustor portion; igniting the combustible fuel and air mixture; causing a high speed jet to exit the exhaust portion; and rotating the shaft as a result of the high speed jet.

DETAILED DESCRIPTION

Figure 1:
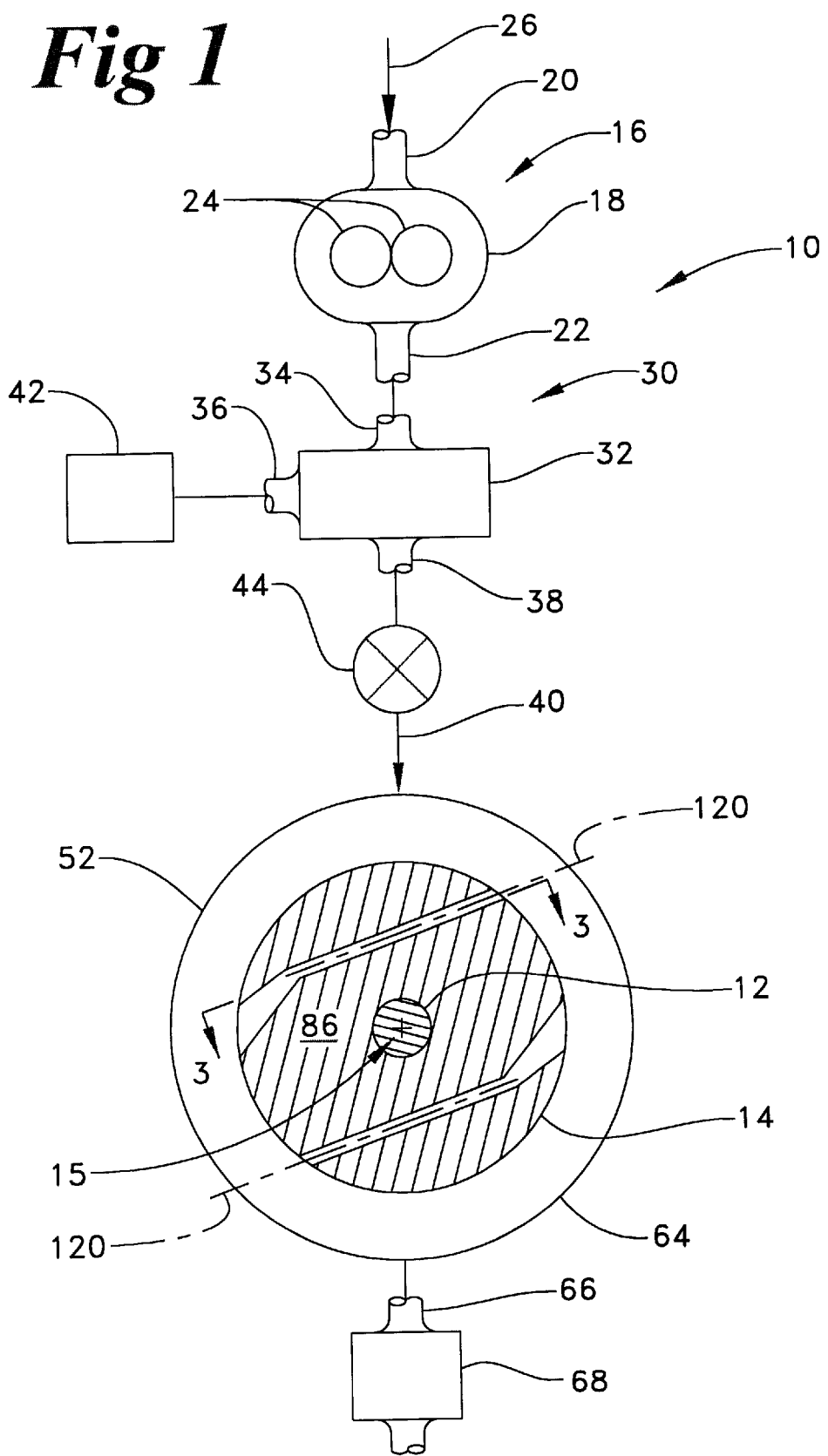
FIG. 1 is a schematic representation of a system using a compact rotary pulse detonation engine therein.

In FIG. 1 a system 10 includes a shaft 12 having a compact rotary pulse detonation engine 14 axially positioned on the shaft 12. The compact rotary pulse detonation engine 14 or a combination thereof is attached to the shaft 12 in a conventional manner. The shaft 12 has an axis 15. The system 10 includes a compressor member 16, such as a blower, turbocharger or any other compressing device 16. The compression member 16 is positioned upstream of the compact rotary pulse detonation engine 14. In this application, the compressor member 16 has a housing 18 in which is positioned an inlet portion 20 and an outlet portion 22. A pair of gears 24 are positioned within the housing 18 and one of the pair of gears 24 is driven by the shaft 12 in a conventional manner. For example, the driven gear 24 may be driven mechanically, electrically, pneumatically or any conventional manner of driving an accessory member. As an alternative, the compressor member may be driven externally of the shaft 12. A flow of atmospheric air, designated by arrow 26 enter the inlet portion 20 of the compressor member 16.

The system 10 includes a mixer member 30 interposed the compressor member 16 and the compact rotary pulse detonation engine 14. The mixer member 30 includes a housing 32 having an air inlet portion 34 and a fuel inlet portion 36. A fuel and air outlet portion 38 is positioned in the housing 32 and has a flow of mixed fuel and air, designated by an arrow 40 exiting therefrom.

The system 10 includes a fuel supply 42 being in fluid communication with the fuel inlet portion 36 of the mixer member 30 in a conventional manner. A plurality of fuels can be used with the compact rotary pulse detonation engine 14 and include any conventional fuel. The fuel can be in a solid, liquid, or gaseous state. Although in this application, a gaseous state is illustrated and nature gas is the example of the fuel used herewith.

Figure 2:
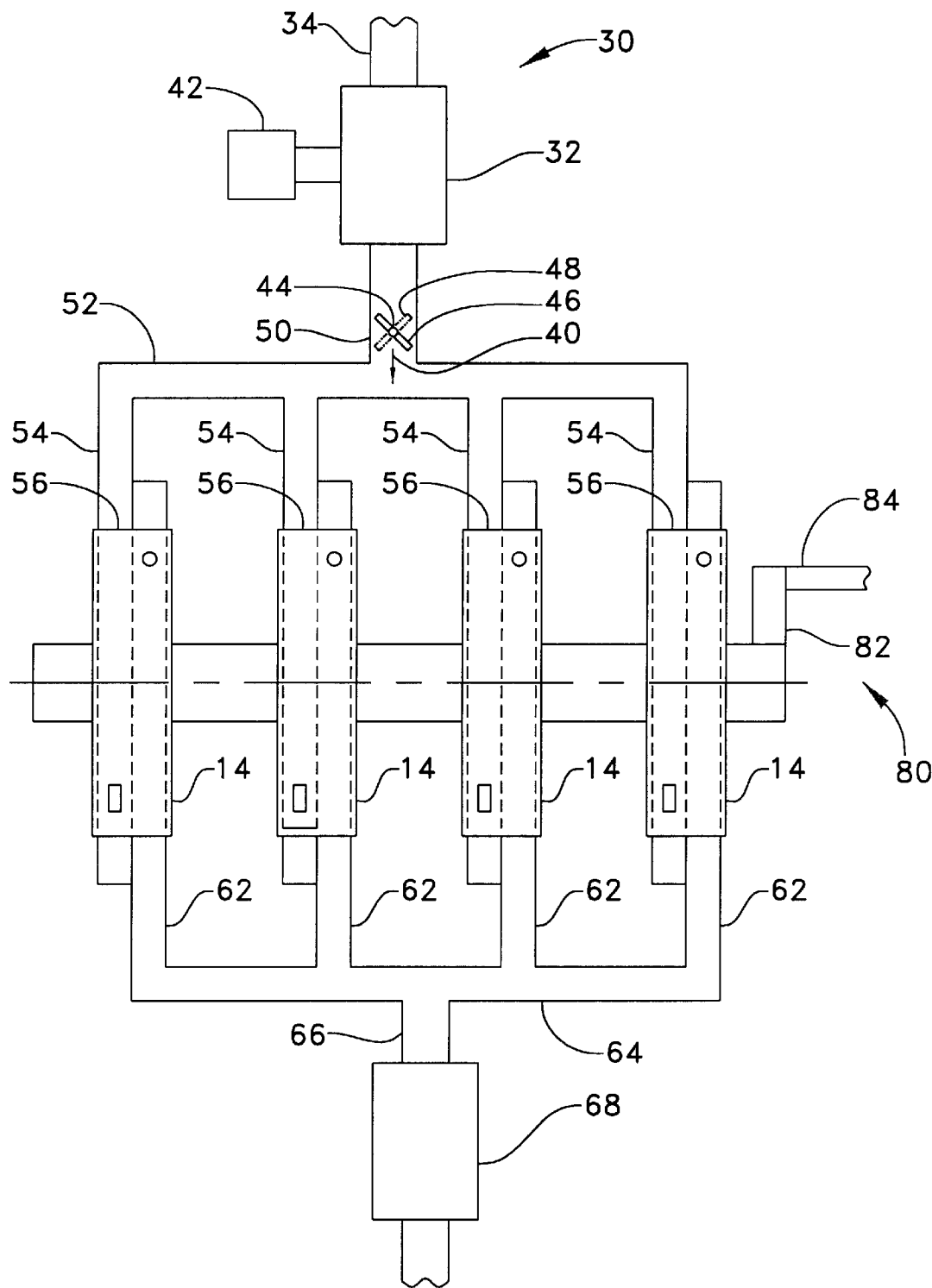
FIG. 2 is a more detailed schematic view of the compact rotary pulse detonation engine taken along an axis of a driven shaft.

As shown in FIG. 2, the system 10 has a control mechanism 44 of conventional configuration. For example, in this application a flapper valve 44 is used and is infinitely operable between an open position 46 and a closed position 48, shown in phantom. Other types of control mechanism 44, such as a poppet mechanism or a variable displace mechanism could be used without changing the gest of the invention.

As shown in FIG. 2, the mixed fuel and air 40 of the system 10 enters an inlet portion 50 of an intake manifold 52. In FIG. 2, four compact rotary pulse detonation engines 14 are spaced axially along the shaft 12 and the axis 15. As an alternative, any number of compact rotary pulse detonation engines 14 could be positioned on the shaft 12. The intake manifold 52 has a plurality of feeder portion 54 radically positioned about a parameter 56 of the respective one of the compact rotary pulse detonation engines 14. In this application, a feeder exhaust portion 62 is radically positioned about the parameter 56 of the respective one of the compact rotary pulse detonation engines 14. Each of the feeder exhaust portions 62 is connected with an exhaust manifold 64. The exhaust manifold 64 has an outlet portion 66 in communication with the atmosphere through a muffler 68. As an alternative, the exhaust manifold 60 and components following therefrom could be eliminated if desirable.

As shown in FIG. 2, a mechanical drive 80 includes a gear 82 and a second shaft 84 connected to the main shaft 12 in a conventional manner. The second shaft 84 is connected to the driven gear 24 of the compressor member 16 in a conventional manner.

Figure 3:
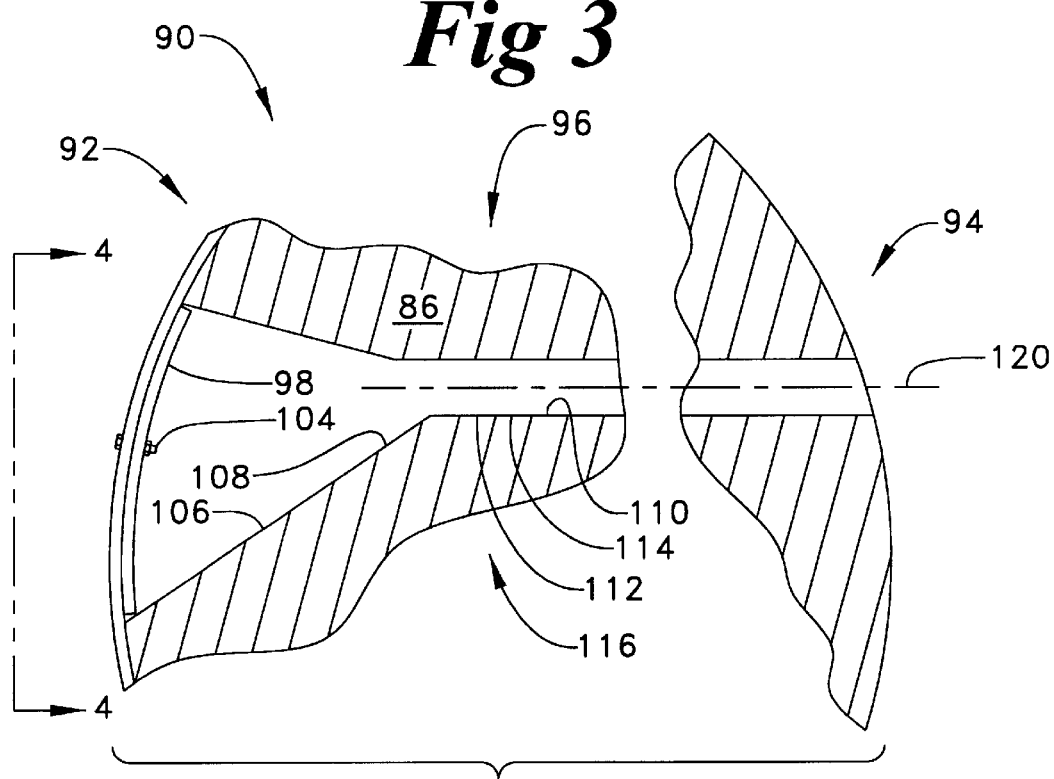
FIG. 3 is a sectional view taken alone line 3—3 of FIG. 2.
Figure 4:
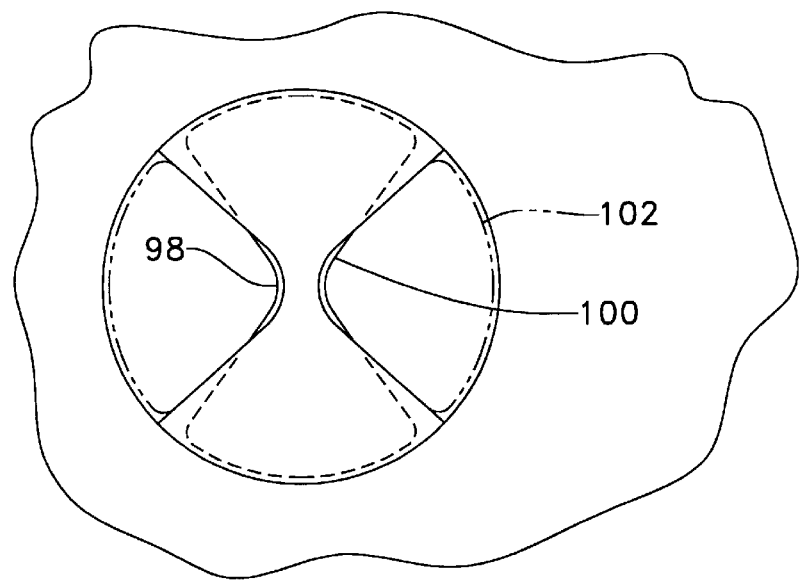
FIG. 4 is a view taken line 4—4 of FIG. 3.

As best shown in FIG. 3, the compact rotary pulse detonation engine 14 has a mass member 86, which in this application has a circular configuration defining the parameter 56 and a preestablished width "W". The mass member 86 could have other configurations such as triangular, hexagonal or square without changing the gist of the invention. The compact rotary pulse detonation engine 14 has a combustor module 90 positioned in the mass member 86. In this application, as best shown in FIG. 1, two combustor module 90 per compact rotary pulse detonation engine 14 is shown; however, any number of combustor module 90 can be employed without changing the gist of the invention. The combustor module 90 includes a intake portion 92 and an exhaust portion 94 positioned at the parameter 56 of the compact rotary pulse detonation engines 14. Interposed the intake portion 92 and the exhaust portion 94 is a combustion portion 96. The intake portion 92 includes an intake valve mechanism 98, which in this application is a rotary intake valve mechanism being operable in a conventional manner. As best shown in FIG. 4, the rotary intake valve mechanism 98 is operated between an open position 100 and a closed position 102 shown in phantom. As an alternative, the intake valve mechanism 98 could be of any conventional design such a shutter mechanism, a flapper mechanism or a poppet mechanism. Positioned in the intake portion 92 is an igniter 104, which in this application is a spark plug. The combustion portion 96 includes a duct 106 having a generally frustoconical first portion 108 and a second portion 110 having a preestablished cross-sectional area. The frustoconical first portion 108 converges to form a deflagration region 112 and progressed into a detonation region 114. The deflagration region 112 and the detonation region 114 form a transition portion 116. The second portion 110 in this application has a generally circular cross-sectional configuration, however, other cross-sectional configurations such as a square, rectangular, oval or hexagonal could also be used without changing the gist of the invention. And, the exhaust portion 94, in this application, also has a generally circular cross-sectional configuration, however, other cross-sectional configurations such as square, rectangular, oval or hexagonal could also be used without changing the gist of the invention.

In this application the combustor module 90 has an axis 120 which is spaced from the axis 15 of the shaft 12 a preestablished distance. In this application, the axis 120 has a straight configuration between the inlet portion 92 and the exhaust portion 94. However, as an alternative, the axis 120 could have a radiused configuration without changing the gest of the invention.

Industrial Applicability

In operation, the system 10 has the atmospheric air 26 drawn into the inlet portion 20 of the compressor member 16 and the pair of gears 24 compress the atmospheric air 26 increasing the temperature and pressure thereof After being compressed the atmospheric air 26 passes through a cooler, not shown. The cooler may be an internal cooler, intercooler or may be positioned externally without changing the jest of the invention. From the cooler, the compressed air 26 enters the air inlet portion 34 of the mixer member 30 and fuel, from the fuel supply 42 enters the fuel inlet portion 36 of the mixer member 30. Within the mixer member 30 the air and fuel are mixed to form the combustible mixture of fuel and air 40. The combustible mixture of fuel and air 40 enter the intake manifold 52 and is distributed to each of the plurality of feeder portions 54. And, with the respective rotary intake valve mechanism 98 in the open position 100 the flow of the combustible mixture of fuel and air 40 enters the inlet portion 92. The respective rotary intake valve mechanism 98 is moved into the closed position 102 and the spark plug 104 is detonated igniting the combustible mixture of fuel and air 40. After ignition the mixture begins as a deflagration wave. Rapid expansion of the gas in the burned region increases the pressure/temperature and causes a transition to a detonation. The detonation region 114 creates supersonic combustion and a shock precedes a flame front greatly increasing the reaction rate raising the temperature of the unburned mixture of fuel and air 40. With the frustoconical configuration a quick deflagration to detonation transition 116 takes place and detonation waves propagate along the combustion portion 96 toward and through the exhaust portion 94. The detonating wave results in combustion of the fuel and air mixture 40 that is two orders of magnitude faster than ordinary combustion such as that of the reciprocating internal combustion engine. And, the pressure in the exhaust portion 94 behind the detonation wave front is one or two orders of magnitude higher than the initial pressure. Because of the high pressure in the exhaust portion 94 behind the detonation wave, the products are ejected from the exhaust portion 94 in the form of high speed jets which causes the mass member 86 to rotate abut the axis 15 of the shaft 12. A rotational speed of the compact rotary pulse detonation engine 14 can be controlled by the control mechanism 44. With the control mechanism 44 in the fully open position 46 a high rate of speed can be developed; however, with the control mechanism 44 very near the closed position 48 a slow speed is developed. By varying the position between the open position 46 and the closed position 48 a wide range of speeds can be developed.

The compact rotary pulse detonation engine 14 provides an alternative to the reciprocating internal combustion engine. The compact rotary pulse detonation engine 14 has less heating of the walls of the combustion portion 96 and the exhaust portion 94 since the combustion process occurs much more quickly. Thus, since less heat is rejected more fuel per unit time can be used and the compact rotary pulse detonation engine 14 has the capacity to generate more power per unit engine. Each combustor module 90 can generate a high specific impulse. And, with the increased pressure of combustion the compact rotary pulse detonation engine 14 result in a thermodynamically more efficient combustion.

Other aspects, objects and advantages of this invention can be obtained from a study of the drawings, the disclosure and the appended claims.

What is claimed is:

1. A pulse detonation engine comprising:

a shaft defining an axis;

a mass member being positioned on said shaft, said mass member having a preestablished width and defining a parameter;

a combustor portion being positioned in said mass member, said combustor portion being spaced from said axis a predetermined distance and defining an intake portion having a portion thereof positioned in said parameter and an exhaust portion having a portion thereof positioned in said parameter, said combustion portion including a frustoconical first portion and said frustoconical first portion including a deflagration region.

2. The pulse detonation engine of claim 1 wherein said combustor portion defining an axis and said axis having a straight configuration.

3. The pulse detonation engine of claim 1 wherein said intake portion includes an intake valve mechanism.

4. The pulse detonation engine of claim 3 wherein said intake portion includes an igniter.

5. The pulse detonation engine of claim 1 wherein said frustoconical first portion includes a detonation region.

6. The pulse detonation engine of claim 1 wherein said frustoconical first portion includes a transition portion.

7. The pulse detonation engine of claim 1 wherein said combustion portion includes a second portion having a preestablished cross-sectional area.

8. The pulse detonation engine of claim 7 wherein said preestablished cross-sectional area has a circular configuration.

9. A system for rotating a shaft, said system comprising:

said shaft having an axis;

a mass member being positioned on said shaft, said mass member having a preestablished width "W" and defining a parameter;

a pulse detonation engine positioned in said mass member, said pulse detonation engine having a combustor portion being positioned in said mass member, said combustor portion being spaced from said axis a predetermined distance and defining an intake portion having a portion thereof positioned in said parameter and an exhaust portion having a portion thereof positioned in said parameter, said combustion portion including a frustoconical first portion and said frustoconical first portion including a deflagration region;

a compressor member being upstream of a flow of fuel and air entering said intake portion of said combustor portion;

a mixer member being interposed said compressor member and said intake portion of said combustor portion; and an intake manifold being interposed said mixer member and said intake portion of said combustor portion.

10. The system for rotating a shaft of claim 9 wherein said shaft having a plurality of mass members thereon.

11. The system for rotating a shaft of claim 9 wherein said compressor member is powered by said shaft.

12. The system for rotating a shaft of claim 9 wherein said mixer member has a fuel inlet portion and wherein a fuel being a gaseous fuel.

13. A method of rotating a shaft, said method comprising:

compressing an atmospheric air;

mixing said compressed atmospheric air with a fuel forming a combustible fuel and air mixture;

attaching a mass member to said shaft, said mass member defining a parameter and said shaft having an axis;

positioning a pulse detonation engine in said mass member, said pulse detonation engine having a combustor portion being positioned in said mass member, said combustor portion being spaced from said axis a predetermined distance and defining an intake portion having a portion thereof positioned in said parameter and an exhaust portion having a portion thereof positioned in said parameter, said combustion portion including a frustoconical first portion and said frustoconical first portion including a deflagration region;

supplying said combustible fuel and air mixture to said intake portion of said combustor portion;

igniting said combustible fuel and air mixture;

causing a high speed jet to exit said exhaust portion; and rotating said shaft as a result of said high speed jet.

14. The method of rotating a shaft of claim 13 wherein said mixing of said compressed atmospheric air with a fuel includes said fuel being a gaseous fuel.

15. The method of rotating a shaft of claim 13 wherein said attaching a mass member to said shaft includes a plurality of mass members.

16. The method of rotating a shaft of claim 13 wherein said positioning a pulse detonating engine in said mass member includes said combustor portion having an axis and said axis being a straight configuration.

17. The method of rotating a shaft of claim 13 wherein said supplying said combustible fuel and air mixture to said intake portion includes said intake portion having an intake valve mechanism.

* * * * *